United States Patent
Suzuki (10) Patent No.: US 8,757,119 B2
(45) Date of Patent: Jun. 24, 2014

(54) ENGINE STOPPING AND RESTARTING SYSTEM

(75) Inventor: Hiromichi Suzuki, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 421 days.

(21) Appl. No.: 13/162,301

(22) Filed: Jun. 16, 2011

(65) Prior Publication Data

US 2012/0318231 A1    Dec. 20, 2012

(51) Int. Cl.
| | |
|---|---|
| F02N 11/02 | (2006.01) |
| F02N 15/02 | (2006.01) |
| F16H 3/44 | (2006.01) |
| H02K 7/10 | (2006.01) |
| F02B 67/08 | (2006.01) |

(52) U.S. Cl.
USPC ............. 123/179.25; 123/198 R; 290/18; 475/5; 180/53.8

(58) Field of Classification Search
USPC .......... 74/7 E; 192/41 R, 45.001, 45.017, 192/45.018; 290/18, 19, 22, 31, 32, 36 R, 290/46; 474/87, 134; 475/5, 16, 257; 310/12.12, 92, 102 R; 180/53.8, 65.1, 180/65.27; 123/179.3, 179.4, 179.25, 123/179.28; 307/9.1, 10.1
See application file for complete search history.

(56) References Cited

U.S. PATENT DOCUMENTS

| | | | |
|---|---|---|---|
| 913,846 A | 3/1909 | Pieper | |
| 1,140,011 A | 5/1915 | Taylor | |
| 4,870,875 A * | 10/1989 | Morishita | 475/153 |
| 5,558,173 A * | 9/1996 | Sherman | 180/53.8 |
| 5,842,944 A * | 12/1998 | Morishita et al. | 475/154 |
| 6,048,288 A | 4/2000 | Tsujii et al. | |
| 6,208,036 B1 | 3/2001 | Evans et al. | |
| 6,453,865 B2 | 9/2002 | Hirose et al. | |
| 6,672,267 B2 * | 1/2004 | Souki et al. | 123/179.3 |
| 6,768,215 B2 * | 7/2004 | Souki et al. | 290/10 |
| 6,845,832 B2 * | 1/2005 | Takizawa et al. | 180/53.8 |
| 6,848,552 B2 | 2/2005 | Miller | |
| 6,910,453 B2 | 6/2005 | Sugino et al. | |
| 7,028,794 B2 * | 4/2006 | Odahara et al. | 180/65.25 |
| 7,051,823 B2 | 5/2006 | Bosch et al. | |
| 7,237,447 B2 * | 7/2007 | Cilibraise | 74/7 E |
| 7,547,264 B2 * | 6/2009 | Usoro | 475/5 |
| 7,582,034 B2 * | 9/2009 | Usoro | 475/5 |
| 8,328,673 B2 * | 12/2012 | Smith et al. | 475/5 |

(Continued)

FOREIGN PATENT DOCUMENTS

| | | |
|---|---|---|
| JP | 1113571 | 5/1989 |
| JP | 8014145 | 1/1996 |

(Continued)

*Primary Examiner* — Hieu T Vo
*Assistant Examiner* — Arnold Castro
(74) *Attorney, Agent, or Firm* — Plumsea Law Group, LLC (57) ABSTRACT

A system that automatically stops an engine when the vehicle is stopped and restarts the engine in response to a predetermined condition is disclosed. The system may generally include an engine and a motor for restarting the engine and driving an auxiliary machine when the engine is stopped, and an electrical power source for supplying electrical power to the motor. The motor may be disposed within a crank pulley housing and configured to be connected to a crankshaft. The motor may restart the engine in response to a predetermined condition. The system may include a gear reduction system for amplifying the torque provided by the motor. The motor may drive an auxiliary machine when the engine is stopped. The engine may drive the auxiliary machine when the engine is operating in drive.

20 Claims, 12 Drawing Sheets

(56) References Cited

U.S. PATENT DOCUMENTS

| | | | |
|---|---|---|---|
| 8,460,152 B2 * | 6/2013 | Parsons et al. | 475/283 |
| 2003/0048014 A1 * | 3/2003 | Souki et al. | 310/92 |
| 2003/0094317 A1 * | 5/2003 | Takizawa et al. | 180/53.8 |
| 2008/0051242 A1 * | 2/2008 | Usoro | 475/5 |
| 2008/0149405 A1 * | 6/2008 | Hladun et al. | 180/53.8 |
| 2008/0179119 A1 * | 7/2008 | Grenn et al. | 180/65.2 |
| 2011/0065543 A1 * | 3/2011 | Usoro | 475/5 |

FOREIGN PATENT DOCUMENTS

| | | |
|---|---|---|
| JP | 9182209 | 7/1997 |
| JP | 11230012 | 8/1999 |
| JP | 2002276401 | 9/2002 |

* cited by examiner

ENGINE STOPPING AND RESTARTING SYSTEM

BACKGROUND

Embodiments of the present invention relate generally to an engine stopping and restarting system, and in particular, a system that automatically stops an engine when the vehicle is stopped and restarts the engine in response to a predetermined condition.

In most conventional vehicles, once the engine is started, it does not stop unless the driver turns off the ignition switch. When the vehicle is temporarily stopped, for example, while waiting at traffic lights, the engine continues to consume fuel as it idles. Because the vehicle is stopped, the engine does not need to operate during these temporary stops. Thus, the engine's consumption of fuel during these temporary stops is wasteful.

SUMMARY

A system that automatically stops an engine when the vehicle is stopped and restarts the engine in response to a predetermined condition is disclosed. In one aspect, an embodiment provides a motor vehicle including an engine, a crank pulley housing, a planetary gear mechanism, a motor, an electrical power source, and an auxiliary machine. The configuration of the crank pulley housing, the planetary gear mechanism, and the motor may be compact leaving more space inside the vehicle for other components. To enhance the compactness of the system, the crank pulley housing may have two functions. The crank pulley housing may be formed to serve as both a crank pulley and a housing. To serve as a crank pulley, the crank pulley housing may have an outer surface configured to receive a pulley belt. To serve as a housing, the crank pulley housing may include walls forming a space configured to receive components. For example, the crank pulley housing may receive the planetary gear mechanism and the motor.

To further enhance the compactness of the system, the motor may have two functions. The motor may be used to restart an engine and to drive an auxiliary machine. The crank pulley housing may be disposed adjacent the engine block to allow the motor to be near the engine for restarting. The planetary gear mechanism may be used to increase the torque provided by the motor when the motor is used to restart the engine. As a result, a smaller, more compact electrical power source to be used to power the motor. To transfer torque from the motor to the engine, the planetary gear mechanism may be configured to be connected to a crankshaft of the engine. To allow the motor or the engine to drive an auxiliary machine, the auxiliary machine may be configured to be driven by one of the motor and the engine.

In another aspect, an embodiment provides a motor vehicle including an engine, a crank pulley housing, a planetary gear mechanism, a motor, an electrical power source, and an auxiliary machine. To serve as both a crank pulley and a housing, the crank pulley housing may have a crank pulley and a crank pulley sidewall. To enhance the compactness of the system, the planetary gear mechanism and the motor may be disposed within the crank pulley housing. The motor may be disposed between the planetary gear mechanism and an inner surface of the crank pulley.

In another aspect, an embodiment provides a system including a crank pulley housing, a planetary gear mechanism, and a motor. To transfer torque from the motor to the engine, the planetary gear mechanism may be configured to be connected to a crankshaft of an engine. To enhance the compactness of the system, the motor may circumferentially surround the planetary gear mechanism and the crank pulley housing may circumferentially surround the motor.

Other systems, methods, features and advantages will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A system for automatically stopping an engine when the vehicle is stopped and restarting the engine in response to a predetermined condition is disclosed. Automatically stopping an engine when the vehicle is temporarily stopped may save fuel. For example, stopping an engine while the vehicle is stopped at a traffic light or idling in slow traffic may reduce the amount of fuel consumed by the engine. After such a temporary stop, the engine may be automatically restarted in response to one or more predetermined conditions. For example, the predetermined condition may include the driver releasing the brake, stepping on the accelerator, or any other condition signaling that the driver intends to start moving again. The system may include a motor for restarting the engine.

While the engine is operating in drive and driving the tires of the vehicle, the engine may also drive an auxiliary machine. For example, the engine may drive an air conditioner compressor, an oil pump, or a water pump. The same motor that restarts the engine may have a second function of driving the auxiliary machine while the engine is stopped. Using the motor for two functions may conserve the number of parts and increase the space available for other components inside the vehicle. Additionally, the second function of the motor may allow an auxiliary machine to continue to run without using the engine. For example, a vehicle may be operating in drive with the engine driving the air conditioner compressor. When the vehicle stops at a traffic light, the engine may stop to conserve fuel. To continue running the air conditioner compressor while the engine is stopped, the motor may drive the air conditioner compressor. Thus, upon stopping the vehicle and the engine, the system may switch from having the engine drive the air conditioner compressor to having the motor drive the air conditioner compressor. Then, when the vehicle is accelerated and the engine is restarted to operate in drive, the engine may again drive the air conditioner compressor while also driving the tires.

Figure 1:
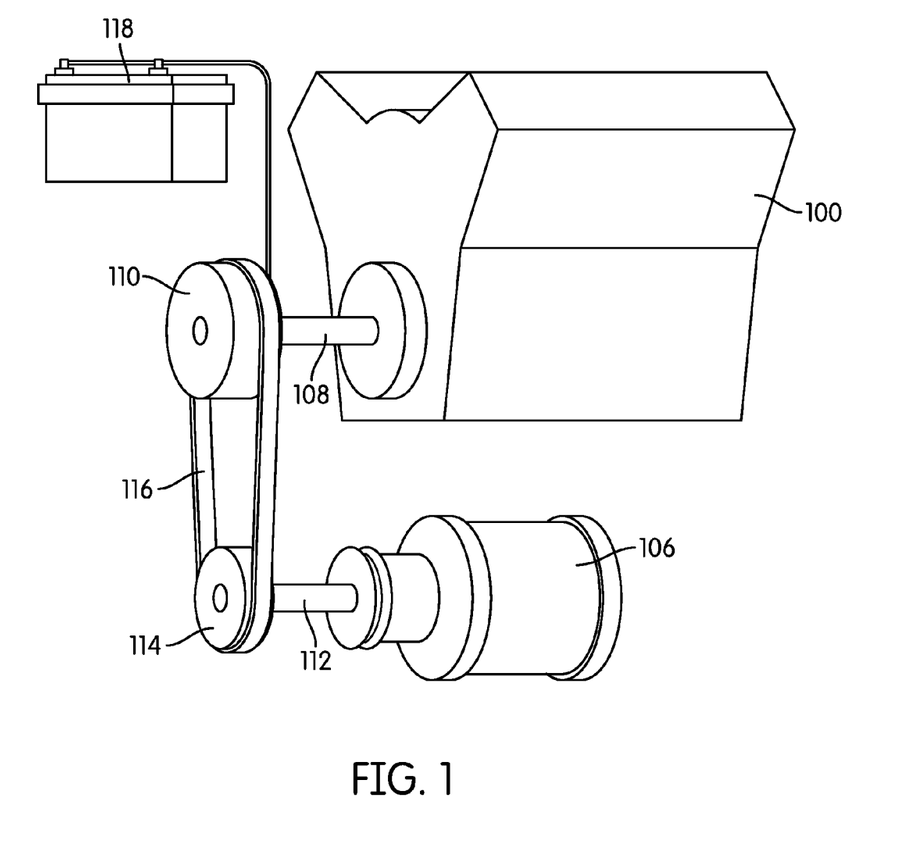
FIG. 1 is the basic configuration of an embodiment of the system.

FIG. 1 shows the basic configuration of an exemplary embodiment of the system. The system may generally include an engine and a motor for restarting the engine and driving an auxiliary machine when the engine is stopped, and an electrical power source for supplying electrical power to the motor. In some embodiments, the system may include sensors for detecting when the engine is stopped and when the predetermined conditions for restarting the engine have occurred. In some embodiments, the system may include a controller for controlling the system. As shown in FIG. 1, the system may include an engine 100 and a crankshaft 108 for transmitting torque to engine 100. A motor may be housed inside a crank pulley housing 110. The motor inside crank pulley housing 110 may cause crank pulley housing 110 to rotate. The motor is described in more detail below with respect to FIGS. 3-9. The electrical power source may include a battery 118 connected to the motor.

The system may include provisions for transmitting torque from the motor to the auxiliary machine. For example, in the embodiment of FIG. 1, such provisions may include an outer surface of crank pulley housing 110. The outer surface of crank pulley housing 110 may be configured to receive a pulley belt 116 connected to a driveshaft 112 of an auxiliary machine. As discussed above, the auxiliary machine may include any type of auxiliary machine included in a vehicle. For example, the auxiliary machine may include a water pump or an oil pump. As shown in the embodiment of FIG. 1, the auxiliary machine may include an air conditioning compressor 106. A pulley belt 116 may be provided around crank pulley housing 110 and air conditioner compressor pulley 114. This positioning of pulley belt 116 may cause air conditioner compressor pulley 114 to rotate when crank pulley housing 110 rotates. Thus, when the motor inside crank pulley housing 110 causes crank pulley housing 110 to rotate, the motor may drive air conditioner pulley 114 and, in turn, air conditioner compressor 106. In some embodiments, crank pulley housing 110 may drive a pulley connected to another type of auxiliary machine in place of or in addition to air conditioner compressor 106. In some embodiments, a clutch may engage and disengage the auxiliary machine such that rotation of crank pulley housing 110 may be selectively transmitted to the auxiliary machine. Crankshaft 108 may be connected to crank pulley housing 110 such that the motor inside crank pulley housing 110 can drive crankshaft 108 and, in turn, engine 100. Similarly, engine 100 may drive crankshaft 108 and, in turn, air conditioner compressor 106.

Figure 2:
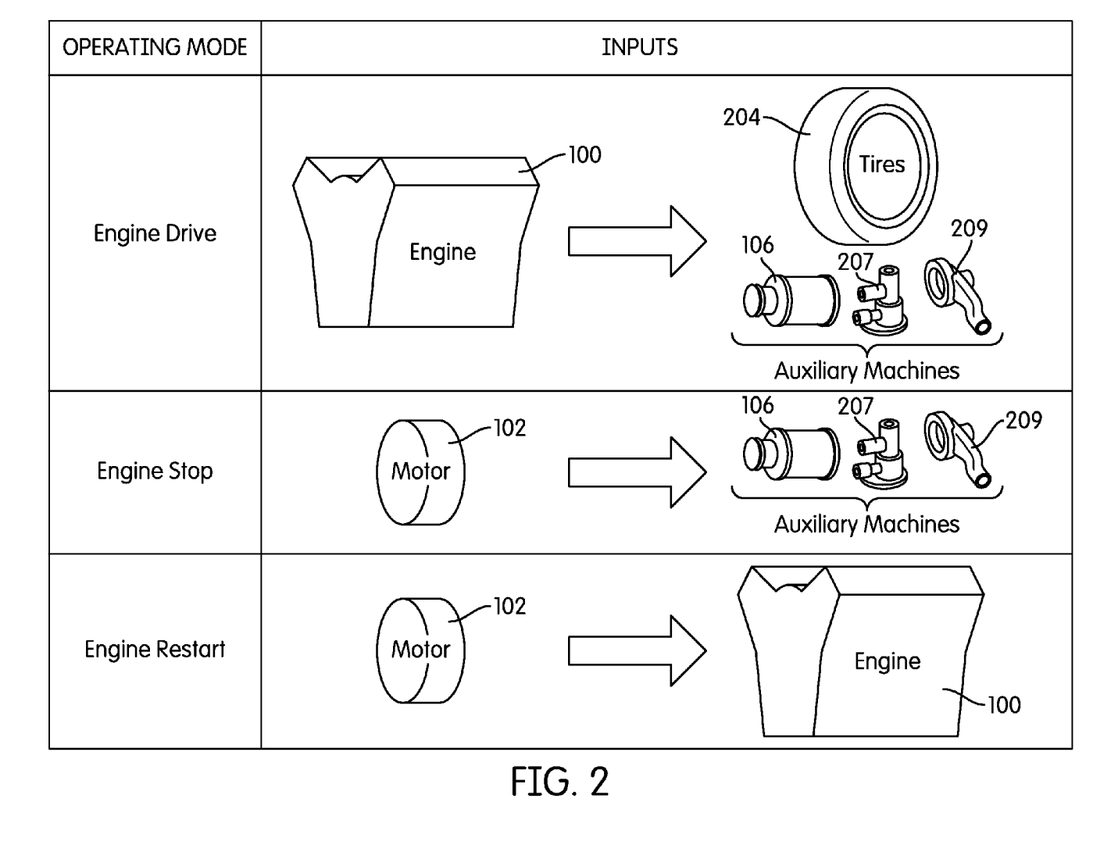
FIG. 2 is a table relating inputs to the operating modes of an engine according to an exemplary embodiment.

FIG. 2 shows different inputs that may be associated with the operating modes of the engine 100 used according to the exemplary embodiment of FIG. 1. When engine 100 is operating in drive, engine 100 may act as an input by driving the tires 204 of the vehicle. Engine may also act as an input by driving an auxiliary machine while driving tires 204. The auxiliary machine may include any type of auxiliary machine included in a vehicle. For example, according to the exemplary embodiment of FIG. 4, the auxiliary machine driven by engine 100 may include an air conditioner compressor 106, an oil pump 207, or a water pump 209. When engine 100 is stopped, motor 102 may act as an input by driving air conditioner compressor 106, oil pump 207, or water pump 209. During the restarting mode, the motor inside crank pulley housing 110 may act as an input by providing torque to restart engine 100. The operating modes of the vehicle will be described in more detail with reference to FIGS. 4-12 below.

Figure 3:
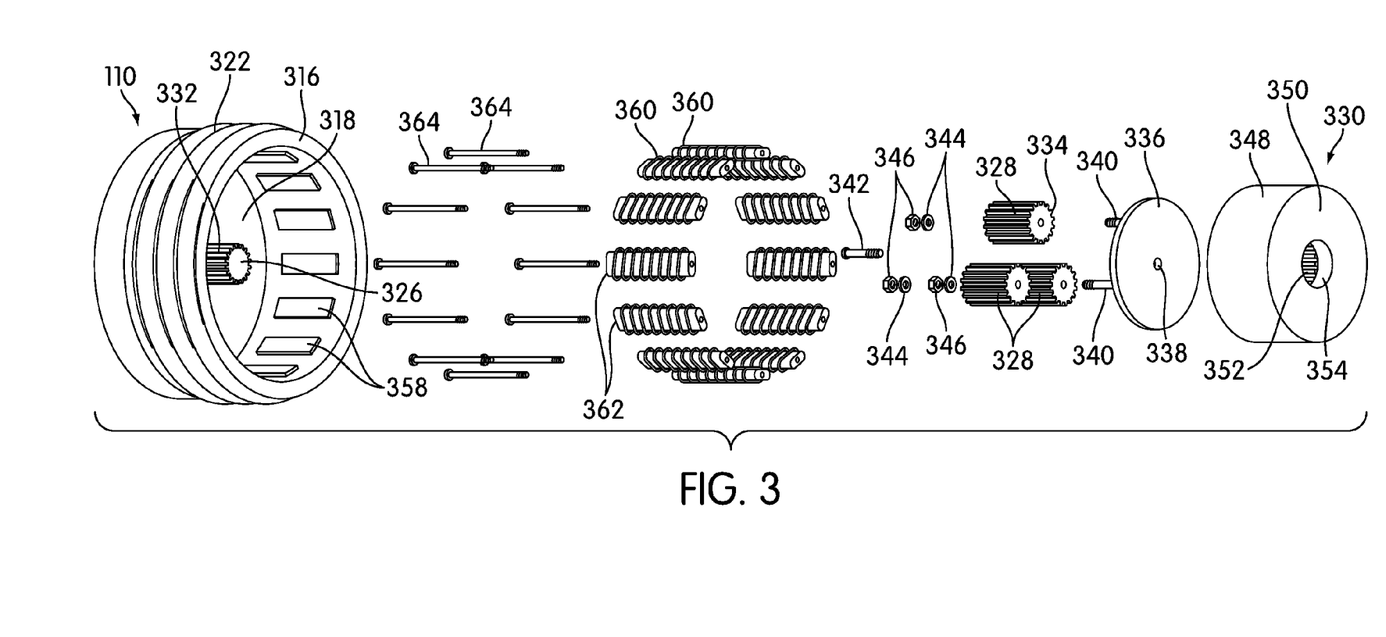
FIG. 3 is an exploded view of the crank pulley housing, planetary gear mechanism, and motor, according to the an embodiment.
Figure 4:
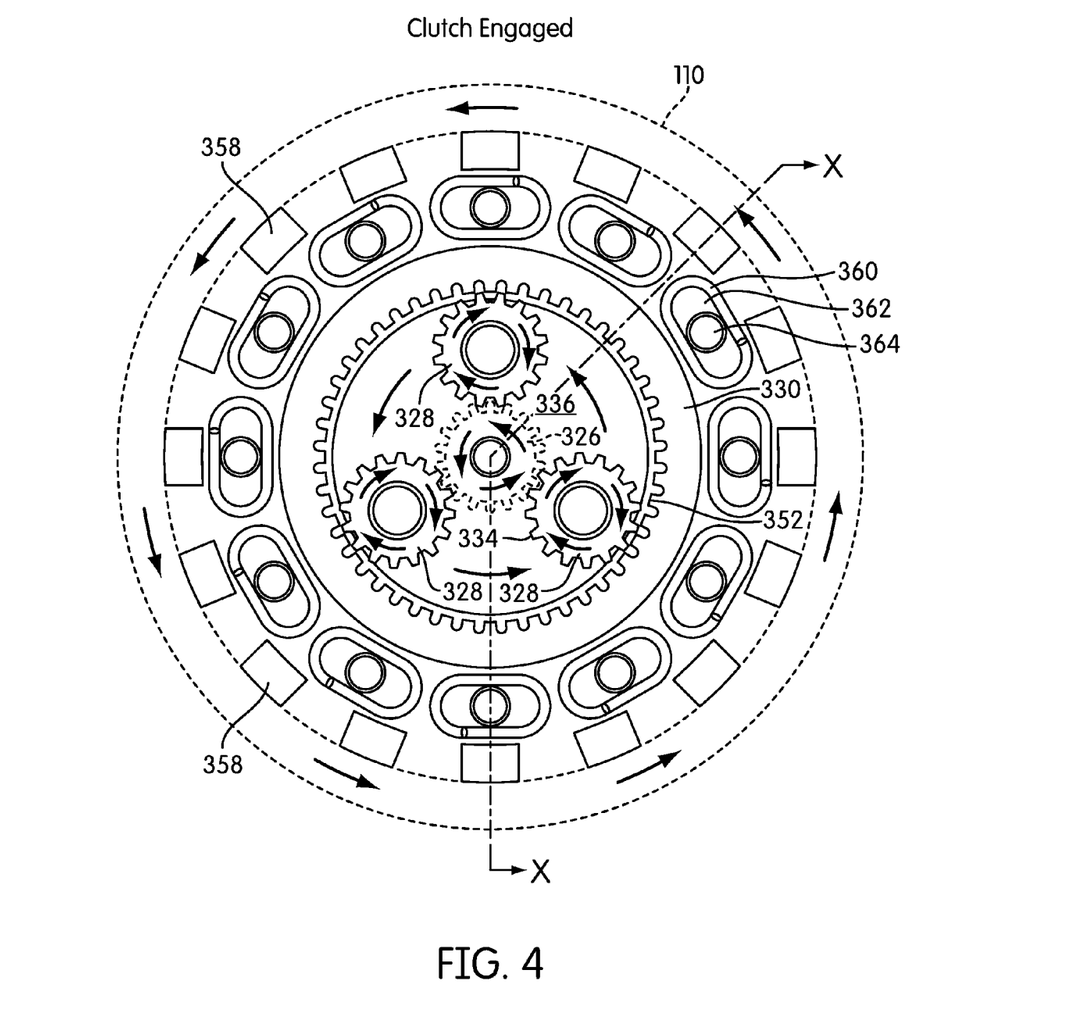
FIG. 4 is a front view of the components that may be disposed inside the crank pulley housing with the crank pulley housing shown in phantom, according to the embodiment of FIG. 3.
Figure 5:
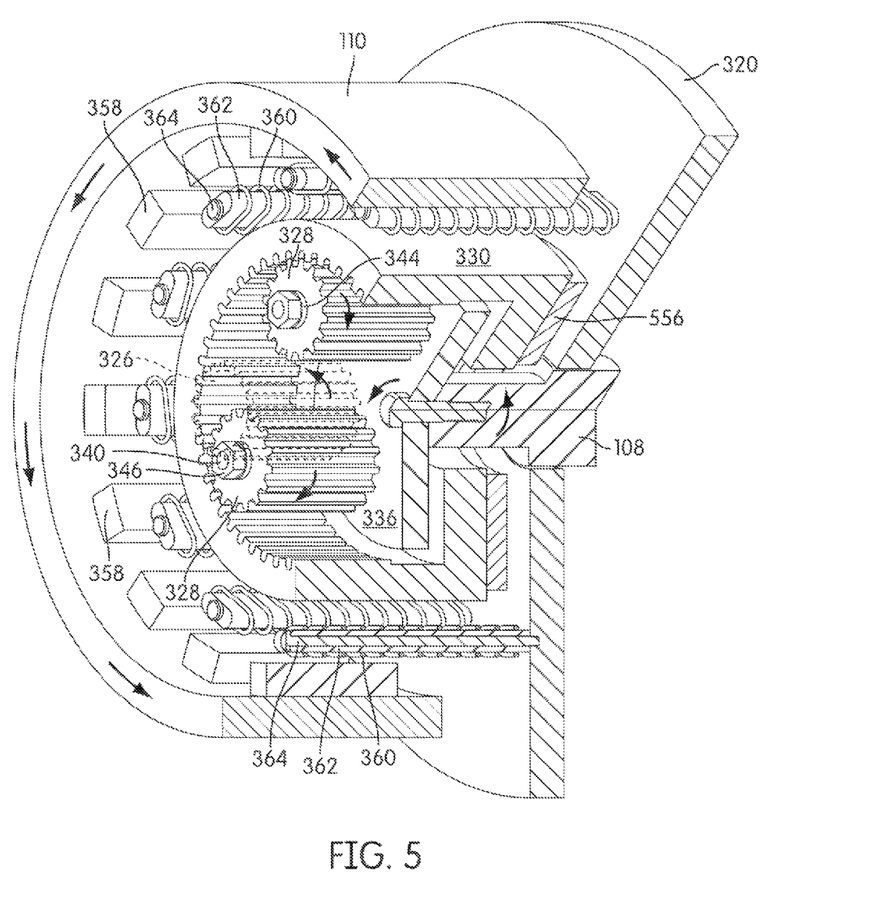
FIG. 5 is a perspective view of the crank pulley housing and the components that may be disposed inside the crank pulley housing with a portion of the crank pulley housing cutaway at axis X, according to the embodiment of FIG. 3.
Figure 6:
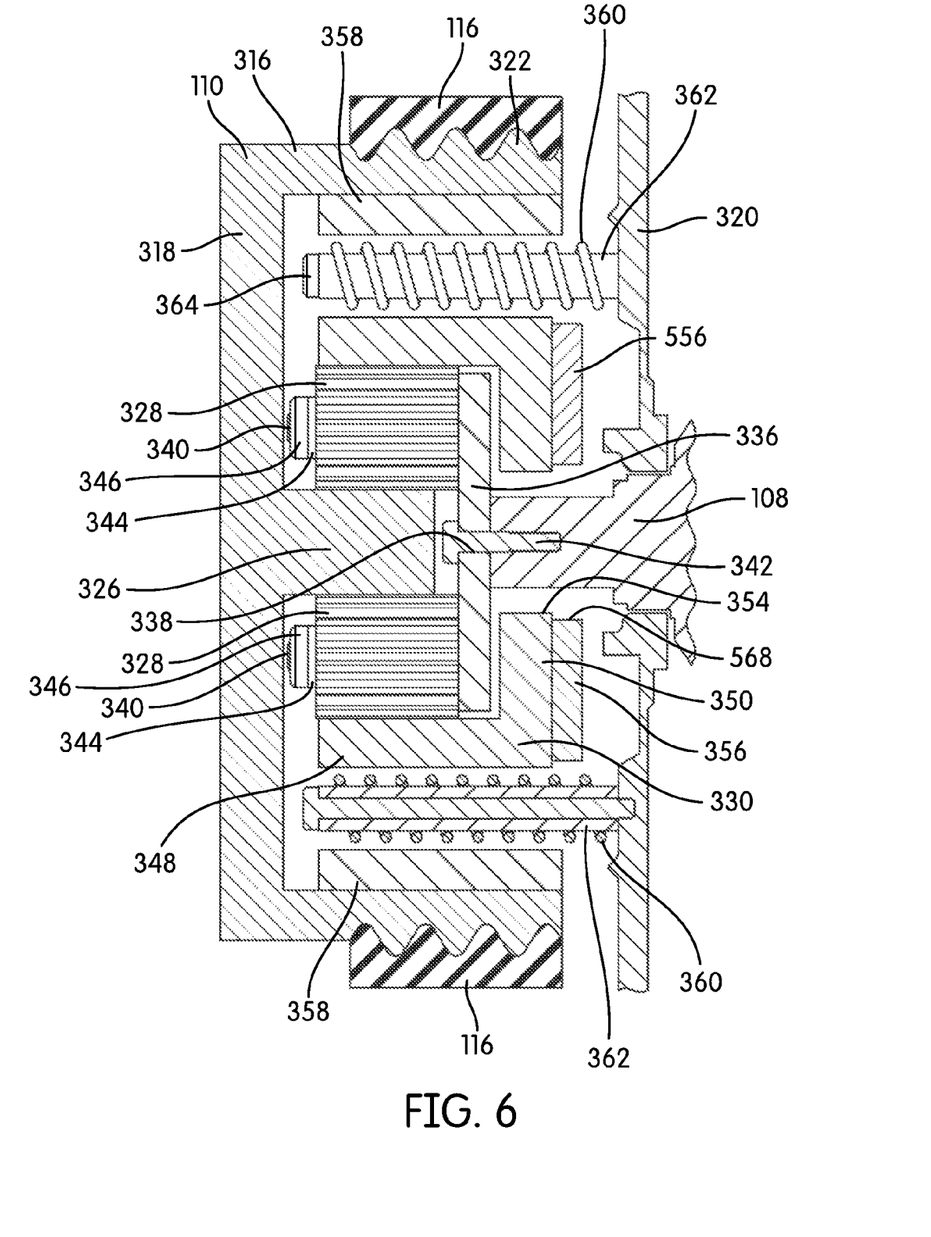
FIG. 6 is a cross-section view of the crank pulley housing and the components that may be disposed inside the crank pulley housing taken along axis X, according to the embodiment of FIG. 3.
Figure 7:
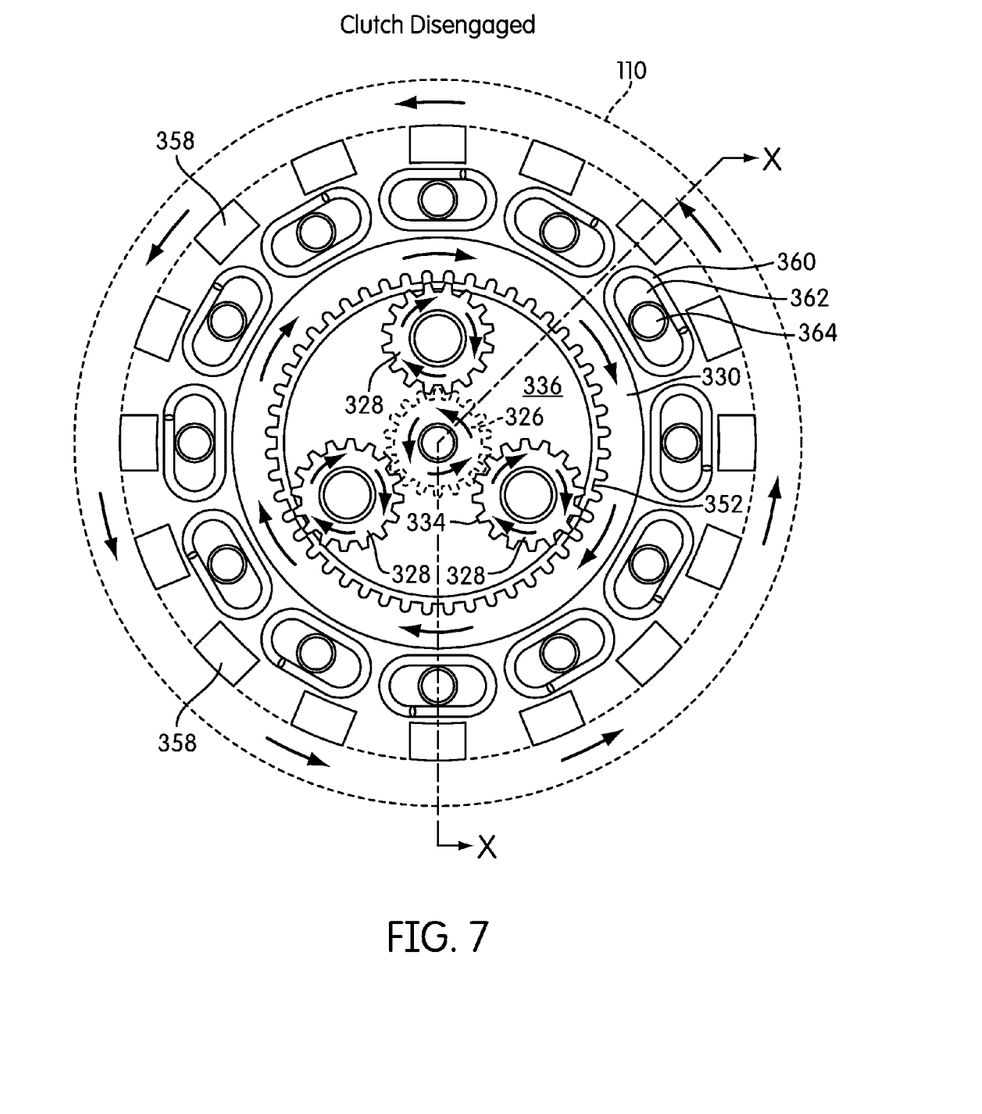
FIG. 7 is a front view of the components that may be disposed inside the crank pulley housing with the crank pulley housing shown in phantom, according to the embodiment of FIG. 3.
Figure 8:
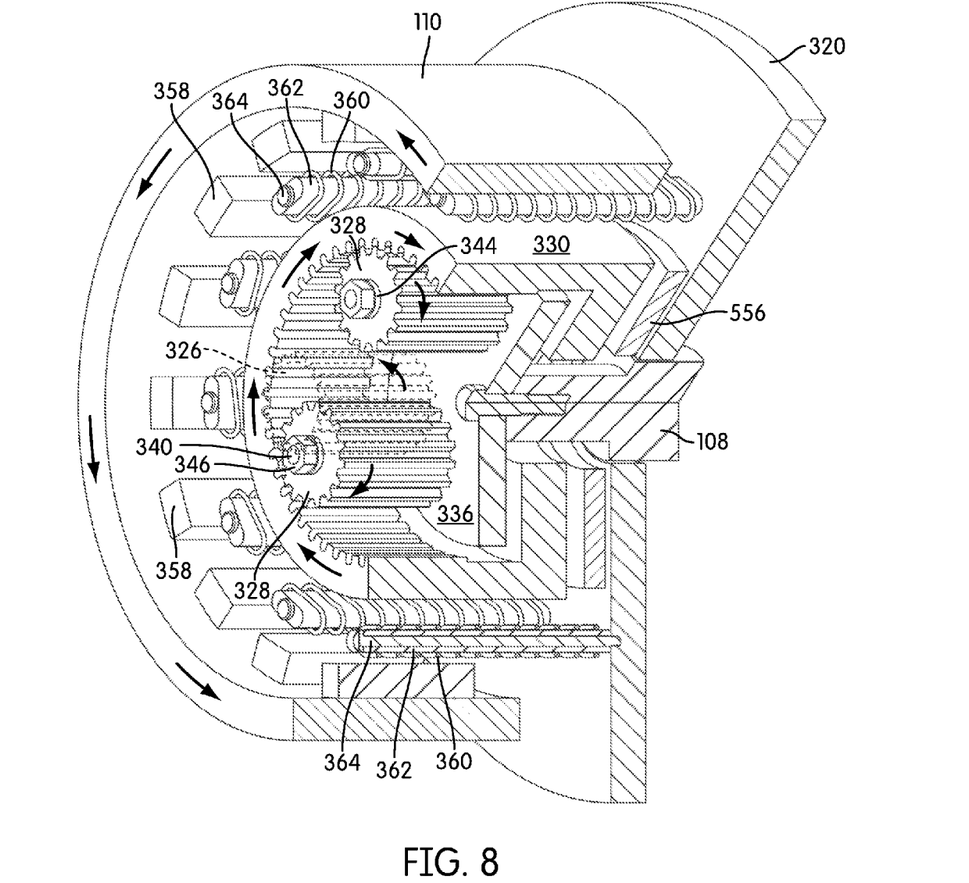
FIG. 8 is a perspective view of the crank pulley housing and the components that may be disposed inside the crank pulley housing with a portion of the crank pulley housing cutaway at axis X, according to the embodiment of FIG. 3.
Figure 9:
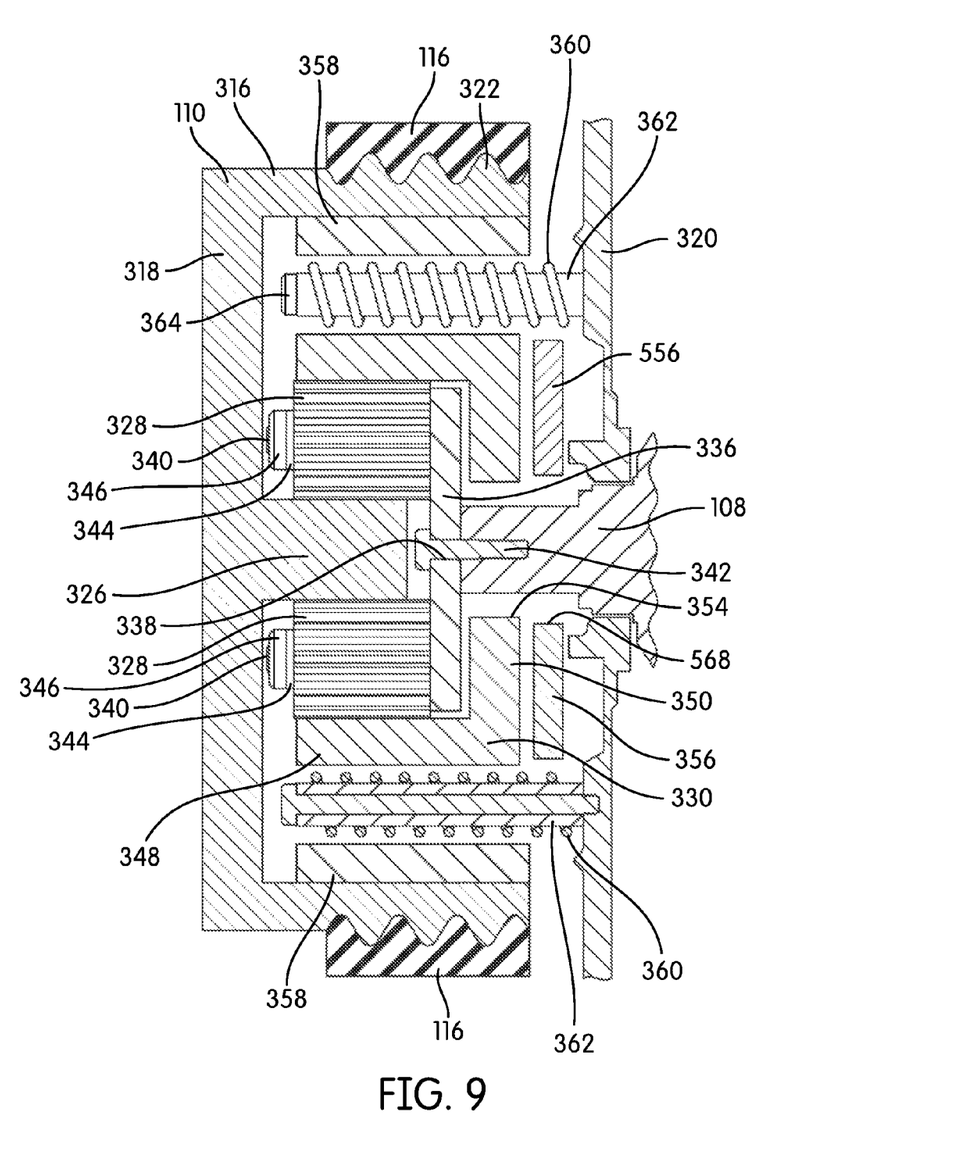
FIG. 9 is a cross-section view of the crank pulley housing and the components that may be disposed inside the crank pulley housing taken along axis X, according to the embodiment of FIG. 3.

FIGS. 3-9 show the details of an embodiment of crank pulley housing 110 and the components that may be disposed inside crank pulley housing 110. Crank pulley housing 110 may be disposed adjacent an engine block 320 of engine 100. As discussed above, the outer surface of crank pulley housing 110 may be configured to receive pulley belt 116. In the embodiment shown in FIGS. 3-9, crank pulley housing 110 may include a crank pulley 316. Crank pulley 316 may include provisions for receiving a pulley belt 116. For example, as shown in FIGS. 3, 6, and 9, crank pulley 316 may include an annular peripheral wall having pulley grooves 322 defined along its outer surface. As discussed in reference to FIG. 1 above, pulley belt 116 may be disposed about crank pulley housing 110 and engaged with pulley grooves 322. In some embodiments, grooves 322 may be replaced by another type of surface feature facilitating engagement with pulley belt 116.

Crank pulley housing 110 may also include provisions for supporting a gear of a gearing mechanism. For example, in the embodiment shown in FIGS. 3-9, crank pulley housing 110 may include crank pulley sidewall 318. In other embodiments, the provisions for supporting a gear may include webbing or brackets. Crank pulley sidewall 318 may be integrally formed with an edge of the annular peripheral wall of crank pulley 316. Crank pulley 316 and crank pulley sidewall 318 may provide an annular space for housing other components. For example, as shown in FIGS. 3-9, crank pulley housing 110 may house a motor and a gearing mechanism.

The system may include a gear mechanism to amplify the torque provided by the motor to restart engine 100. For example, as shown in FIGS. 3-9, the system may include a planetary gear mechanism. The increased torque provided by the gear mechanism may allow the motor to restart engine 100 with a small electrical power source. For example, in some embodiments, the motor may be charged with a 12 V battery to restart engine 100. Such a small electrical power source may leave more space inside the vehicle for other components.

The planetary gear mechanism may include a sun gear 326, planet gears 328, and an outer gear 330. Sun gear 326 may have sun gear teeth 332. In some embodiments, sun gear 326 may be configured to move in unison with crank pulley housing. For example, in some embodiments, sun gear 326 may be connected to crank pulley housing 110 so that rotation of sun gear 326 is transferred to crank pulley housing 100 and vice versa. In some embodiments, sun gear 326 may be separately formed and connected to crank pulley housing 110. Any known mechanism may be used to connect sun gear 326 to crank pulley housing 110. For example, sun gear 326 may be connected to crank pulley housing by a bolts or screws. In some embodiments, as shown in FIGS. 3, 5-6, and 8-9, sun gear 326 may be integrally formed with crank pulley housing 110 and may extend from the center of crank pulley sidewall 318. Sun gear 326 may be disposed at the center of the planetary gear mechanism.

Planet gears 328 may have planet gear teeth 334. Planet gear teeth 334 may be configured to mesh with sun gear teeth 332. Planet gears 328 may be configured to surround sun gear 326. For example, planet gears 328 may be configured to circumferentially surround sun gear 326. According to the embodiment shown in FIGS. 3-9, the planetary gear mechanism may include three planet gears 328. In other embodiments, the planetary gear mechanism may include any number of planet gears. For example, the planetary gear mechanism may include four or five planet gears. The number of planet gears 328 may be selected according to a variety of factors. For example, the number of planetary gears 328 may be selected according to the desired torque to be provided by the planetary gear mechanism.

The system may include provisions for receiving planet gears 328. For example, in the embodiment shown in FIGS. 3-9, planet gears 328 may be disposed on a planet carrier 336. In other embodiments, planet gears 328 may be carried by other types of planet carriers. For example, planet gears 328 may be carried by a webbed planet carrier. As shown in FIGS. 3-9, planet carrier 336 may include a circular plate. Planet carrier 336 may include an opening 338 for receiving a bolt 342 for attaching planet carrier 336 to crankshaft 108. Thus, as crankshaft 108 rotates, planet carrier 336 may rotate. In some embodiments, planet carrier 336 may be secured to crankshaft 108 by other mechanisms known in the art. For example, planet carrier 336 may be secured to crankshaft 108 by a press fit. In other embodiments, planet carrier 336 may be integrally formed with crankshaft 108.

Planet carrier 336 may include provisions for carrying planet gears 328. For example, as shown in FIG. 3, planet carrier 336 may include bolts 340 configured to receive and carry planet gears 328. The number of bolts 340 may correspond to the number of planet gears 328. As shown in FIG. 3, bolts 340 may be formed integrally with planet carrier 336. In some embodiments, bolts 340 and planet carrier 336 may be formed separately. For example, a planet carrier of another embodiment may include holes for receiving bolts. In some embodiments, a planet carrier may include a variety of holes allowing the number and/or position of the planet gears to be adjustable. Bolts 340 may be positioned so that planet gears 328 circumferentially surround sun gear 326 and planet gear teeth 334 mesh with sun gear teeth 332. Planet gears 328 may be rotatably mounted on bolts 340. The system may include provisions for securing planet gears 328 onto bolts 340. For example, as shown in FIG. 3, nuts 346 may be provided to secure planet gears 328 onto bolts 340. Washers 344 may be provided between planet gears 328 and nuts 346. Planet carrier 336 may be configured to carry planet gears 328 within outer gear 330.

Outer gear 330 may include a ring gear 348. Ring gear 348 may include ring gear teeth 352. Ring gear teeth 352 may be configured to mesh with planet gear teeth 332. Ring gear 348 may be configured to circumferentially surround planet gears 328. Ring gear 348 may be configured to allow ring gear teeth 352 to contact and mesh with planet gear teeth 334. Outer gear 330 may include provisions for engaging with a clutch 556. For example, in some embodiments, an annular peripheral wall of ring gear 348 may include a surface feature configured to mesh with clutch 556. In some embodiments, as shown in FIGS. 3, 5-6, and 8-9, outer gear 330 may include an outer gear sidewall 350. Outer gear sidewall 350 may be configured to mesh with a surface of clutch 556. As a result, clutch 556 may engage outer gear sidewall 350, as discussed below with reference to FIGS. 4-9. In some embodiments, outer gear sidewall 350 may be integrally formed with an outer gear sidewall 350. In some embodiments, outer gear sidewall 350 may be separately formed and connected to ring gear 348. Outer gear sidewall 350 may be configured to receive crankshaft 108. For example, outer gear sidewall 350 may include an opening 354 for receiving crankshaft 108. Opening 354 may be configured to provide space crankshaft 108 to rotate. For example, opening 354 may have a diameter that is slightly larger than the diameter of the crankshaft 108.

In the embodiment shown in FIGS. 3-9, the motor may include a brushless motor. In other embodiments, the motor may include any known type of motor. The motor in the embodiment shown in FIGS. 3-9 may be formed by a plurality of magnets 358 and coils 360. As shown in FIGS. 3-9, magnets 358 and coils 360 may be configured to be disposed within crank pulley housing 110. In some embodiments, magnets 358 and coils 360 may be configured to circumferentially surround outer gear 330 of the planetary gear mechanism. Magnets 358 may be fixed along an inner surface of peripheral wall of crank pulley 316. In other embodiments, magnets 358 may be fixed to crank pulley sidewall 318. In some embodiments, coils 360 may include insulated metal wire wound around cores 362. For example, coils 360 may include insulated copper wire wound around cores 362. Battery 118 may be electrically connected to coils 360. Cores 362 may include any know electrically conductive material. For example, cores 362 may include iron. In some embodiments, the number of magnets 358 and coils 360 may be selected according to a variety of factors. For example, the number of magnets 358 and coils 360 may be selected according to the desired speed and/or torque of the motor. In some embodiments, the size of magnets 358 and coils 360 may be selected according to a variety of factors. For example, the size of magnets 358 and coils 360 may be selected according to the desired speed and/or torque of the motor. In some embodiments, the size of magnets 358 and coils 360 may be selected to fit within the space provided within crank pulley housing 110.

Coils 360 and cores 362 may be configured to be disposed between magnets 358 and outer gear 330. Coils 360 and cores 362 may be configured to leave a first small air gap between magnets 358 and coils 360. Likewise, coils 360 may be configured to leave a second small air gap between coils 360 and outer gear 330. The small air gaps may permit magnets 358 and outer gear 330 to rotate without contacting coils 360. Thus, magnets 358 and outer gear 330 may rotate while coils 360 are stationary. The system may include provisions for fixing cores 362 to engine block 320. For example, as shown in FIGS. 3, 5, 6, 8, and 9, the system may include screws 364 for fixing cores 362 to engine block 320. In some embodiments, cores 362 may be fixed to engine block 320 by any other known mechanism. In some embodiments, cores 362 may be fixed to a cover or other component fixed to the engine block 320. In some embodiments, cores 362 may be integrally formed with engine block 320 or other components fixed to engine block 320. In yet other embodiments, cores 362 may be fixed to an inner surface of crank pulley 316 while magnets 358 are fixed to engine block 320 or another component fixed to engine block 320. If coils 360 are energized by battery 118, the coils 360 and cores 362 may create a magnetic force. By alternating electrical power to certain coils 360 at a predetermined timing, attracting forces and/or repelling forces between coils 360 and magnets 358 may cause crank pulley housing 110 to rotate.

The system may include provisions for fixing outer gear 330 to prevent outer gear from 330 from rotating and releasing outer gear 330 to allow outer gear 330 to rotate. For example, as shown in FIGS. 5-6 and 8-9, the provisions for fixing and releasing outer gear 330 may include clutch 556. Clutch 556 may include any known type of clutch capable of being selectively engaged and disengaged with outer gear 330. For example, as shown in FIGS. 5-6 and 8-9, clutch 556 may include a circular disk configured to engage with outer gear sidewall 350. Clutch 556 may include a surface feature configured to engage with outer gear sidewall 350. For example, clutch 556 may include grooves corresponding with grooves provided on outer gear sidewall 350. In some embodiments, clutch 556 may be an electromagnetic clutch. In some embodiments, clutch 556 may be activated by a mechanical mechanism. Clutch 556 may be configured to be disposed adjacent outer gear 330. In some embodiments, clutch 556 may be configured to be disposed between outer gear 330 and engine block 320. Clutch 556 may include an opening 568 for receiving crankshaft 108. Clutch 556 may be sized to fit within an annular space provided by coils 360. When clutch 556 is engaged, as shown in FIGS. 4-6, outer gear 330 may be fixed so that it does not rotate. When clutch 556 is disengaged, as shown in FIGS. 7-9, outer gear 330 may be free to rotate around planet gears 328.

FIGS. 4-5 include arrows showing the motion of crank pulley housing 110 and the components that may be disposed inside crank pulley housing 110 when clutch 556 is engaged. The motion may be the same whether engine 100 is operating in drive or engine 100 is being restarted. Engaging clutch 556 may allow rotation to be transmitted between crankshaft 108 and crank pulley housing 110. Thus, when clutch 556 is engaged, crank pulley housing 110 may transfer rotation to crankshaft 108. Similarly, when clutch 556 is engaged, engine 100 may transfer rotation to crankshaft 108 and crankshaft 108 may transfer rotation to crank pulley housing 110.

Referring to FIGS. 4-5, when engine 100 is operating in drive, clutch 556 may be engaged and crankshaft 108 may rotate. Due to the connection between planet carrier 336 and crankshaft 108, rotation of crankshaft 108 may cause planet carrier 336 to rotate at the same speed and in the same direction as crankshaft 108. As planet carrier 336 rotates, planet gears 328 may travel along a circular path about a longitudinal axis of crankshaft 108. With clutch 556 preventing rotation of outer gear 330 and planet gear teeth 334 meshing with stationary ring gear teeth 352, planet gears 328 may rotate about bolts 340 as planet gears 328 travel along the circular path. Because planet gear teeth 334 may mesh with sun gear teeth 332 and planet gears 328 may not transmit rotation to fixed outer gear 330, rotation of planet gears 328 about bolts 340 may cause planet gears 328 to transmit rotation to sun gear 326. As a result, sun gear 326 may rotate about its longitudinal axis. Because sun gear 326 may be configured to move in unison with crank pulley housing 110, the rotation of sun gear 326 may cause crank pulley housing 110 to rotate.

Figure 10:
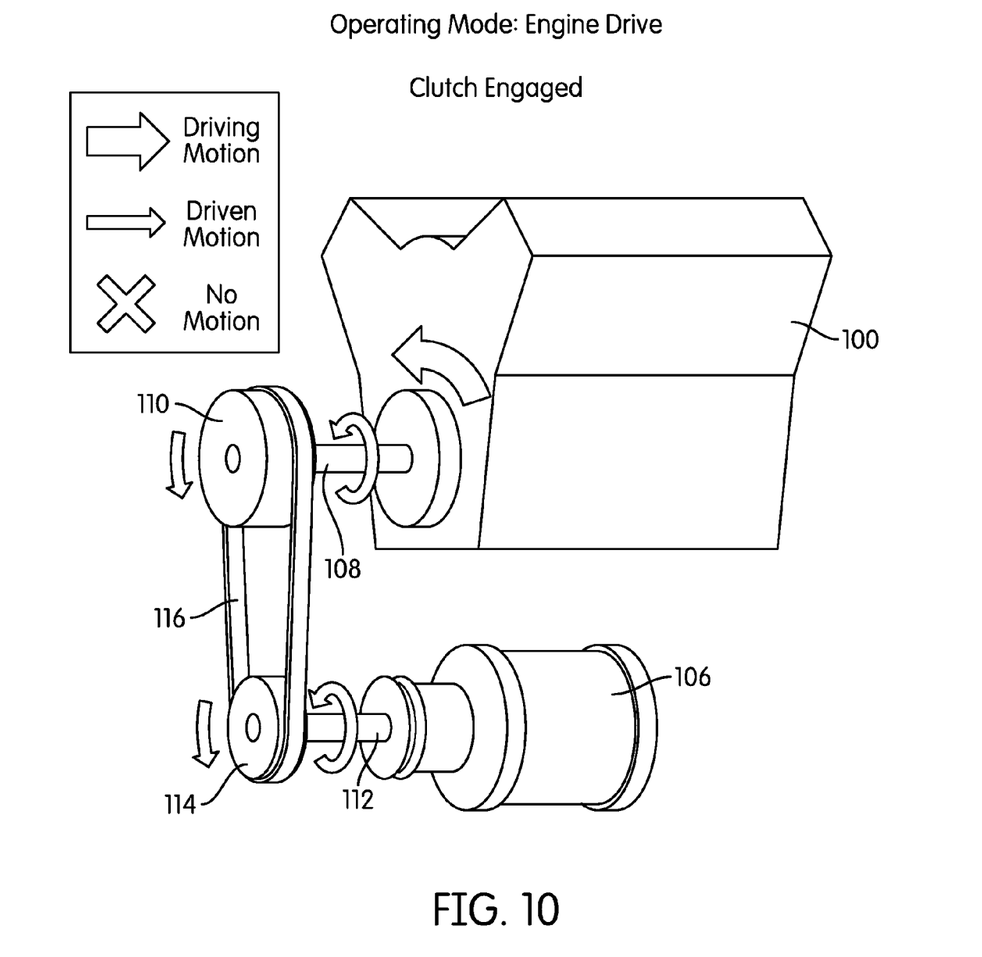
FIG. 10 shows the system's motion involved when the engine is operating in drive, according to an exemplary embodiment.

FIG. 10 demonstrates the system's motion involved when engine 100 is operating in drive and clutch 556 is engaged. When engine 100 is operating in drive and clutch 556 is engaged, engine 100 may provide the driving motion. As discussed above with reference to FIG. 2, engine may drive both the tires of the vehicle and air conditioner compressor 106. While driving the tires of the vehicle, engine 100 may cause crankshaft 108 to rotate. As discussed in detail above with reference to FIGS. 4-5, engaging clutch 556 and fixing outer gear 330 may cause the rotation of crankshaft 108 to be transferred to crank pulley housing 110. The rotation of crank pulley housing 110 may cause pulley belt 116 to move. The motion of pulley belt 116 may cause air conditioner pulley 114 to rotate. As a result, air conditioner pulley 114 may transmit rotation to drive shaft 112 causing drive shaft 112 to rotate and drive air conditioner compressor 106.

FIGS. 7-8 include arrows showing the motion of crank pulley housing 110 and the components that may be disposed inside crank pulley housing 110 when clutch 556 is disengaged. Disengaging clutch 556 may prevent rotation from being transmitted between crankshaft 108 and crank pulley housing 110. Thus, when clutch 556 is disengaged, crank pulley housing 110 may rotate without transferring rotation to crankshaft 108. Likewise, crankshaft 108 may rotate without transferring rotation to crank pulley housing 110.

Referring to FIGS. 7-8, when engine 100 is stopped, clutch 556 may be engaged and the motor may be activated to cause crank pulley housing 110 to rotate. Because sun gear 326 may be configured to move in unison with crank pulley housing 110, the rotation of crank pulley housing 110 may cause sun gear 326 to rotate. Sun gear teeth 332 may mesh with planet gear teeth 334 causing planet gears 328 to rotate about bolts 340 as sun gear 326 rotates. Because outer gear 330 is free to rotate when clutch 556 is disengaged and ring gear teeth 352 may mesh with planet gear teeth 334, rotation of planet gears 328 may be transmitted to outer gear 330. As a result, outer gear 330 may rotate about planet carrier 336. With the rotation of planet gears 328 being transmitted to outer gear 330 instead of planet carrier 336, planet gears 328 may rotate about bolts 340 without causing planet carrier 336 to rotate. Consequently, planet carrier 336 and crankshaft 108 may remain stationary with respect to the longitudinal axis of crankshaft 108.

Figure 11:
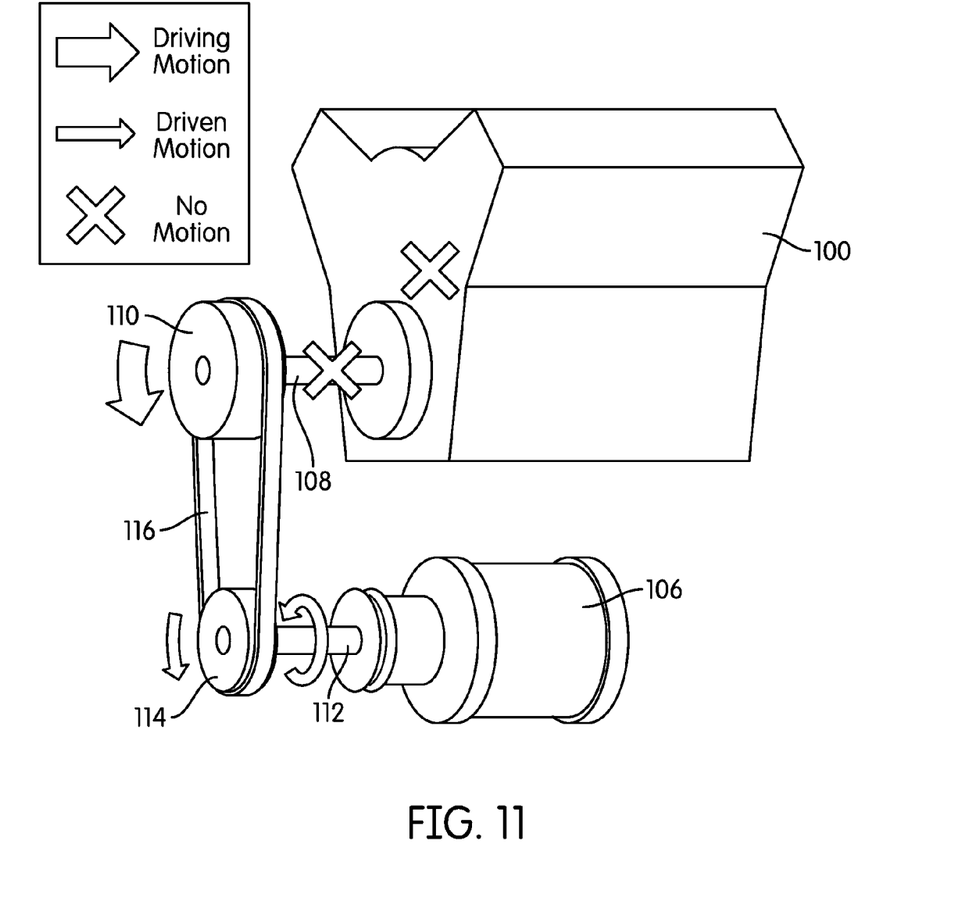
FIG. 11 shows the system's motion involved when the engine is stopped, according to an exemplary embodiment.

FIG. 11 demonstrates the system's motion involved when engine 100 is stopped and clutch 556 disengaged. When engine 100 is stopped, crankshaft 108 may be stationary and clutch 556 may be disengaged allowing outer gear 330 to rotate. As discussed above with reference to FIGS. 7-8, releasing outer gear 330 may allow the motor to rotate crank pulley housing 110 without transferring motion to crankshaft 108. While engine 100 is stopped, the motor may be activated to cause crank pulley housing 110 to rotate, providing the driving motion. The rotation of crank pulley housing 110 may cause pulley belt 116 to move. The motion of pulley belt 116 may cause air conditioner pulley 114 to rotate. As a result, air conditioner pulley 114 may transmit rotation to drive shaft 112 causing drive shaft 112 to rotate and drive air conditioner compressor 106.

When the predetermined conditions for restarting engine 100 are met, engine 100 may be restarted. Referring back to FIGS. 4-5, when engine 100 is being restarted, clutch 556 may be engaged and the motor may be activated to cause crank pulley housing 110 to rotate. Because sun gear 326 may be configured to move in unison with crank pulley housing 110, the rotation of crank pulley housing 110 may cause sun gear 326 to rotate. Sun gear teeth 332 may mesh with planet gear teeth 334 causing planet gears 328 to rotate about bolts 340 as sun gear 326 rotates. With clutch 556 preventing movement of outer gear 330 and planet gear teeth 334 meshing with stationary ring gear teeth 352, the rotation of planet gears 328 may cause planet gears 328 to travel along a circular path adjacent ring gear teeth 352. As planet gears 328 travel along the circular path, planet carrier 336 may rotate about the longitudinal axis of crankshaft 108. Consequently, due to the connection between planet carrier 336 and crankshaft 108, rotation of planet carrier 336 may cause crankshaft 108 to rotate at the same speed and in the same direction as planet carrier 336. As rotation is transmitted from the motor to crankshaft 108 via the planetary gear mechanism, the planetary gear mechanism may act as a gear reduction system increasing the torque provided by the motor. As a result, the amplified torque may restart engine 100.

Figure 12:
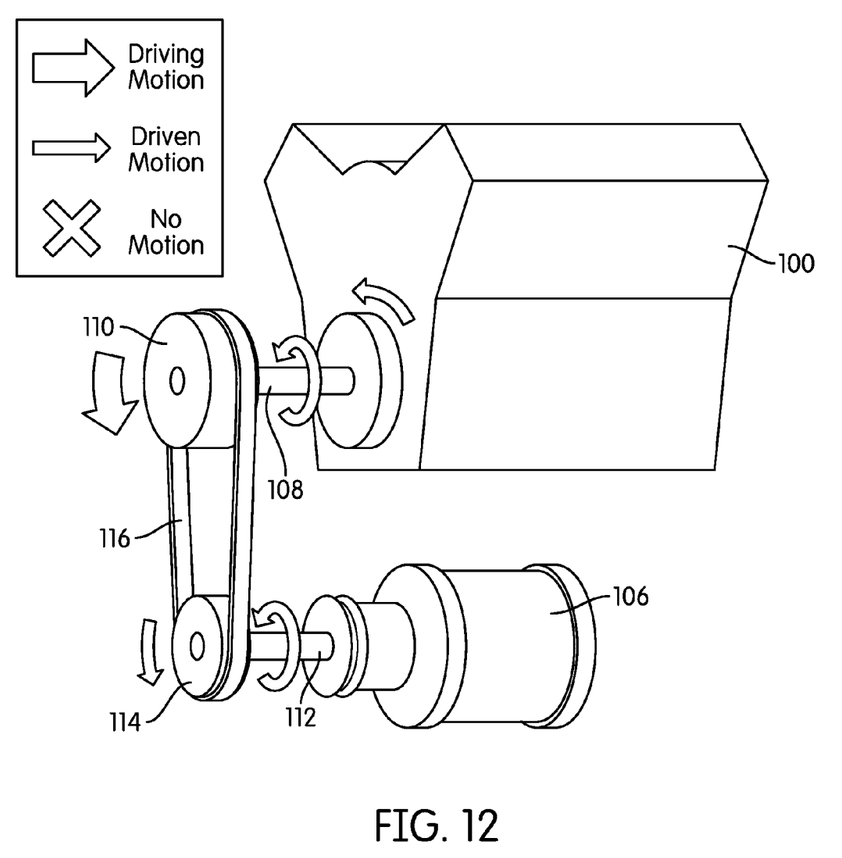
FIG. 12 shows the system's motion involved when restarting the engine, according to an exemplary embodiment.

FIG. 12 demonstrates the system's motion involved when restarting engine 100. When restarting engine, clutch 556 may be engaged and the motor may be activated to cause crank pulley housing 110 to rotate, providing the driving motion. As discussed in detail above with reference to FIGS. 4-5, engaging clutch 556 and fixing outer gear 330 may cause the rotation of crank pulley housing 110 to be transmitted to crankshaft 108. The rotation of crankshaft 108 may cause engine 100 to restart. If the motor was driving air conditioning compressor 106 while engine 100 was stopped, the motor may continue to drive air conditioning compressor 106 when engine 100 is being restarted. The rotation of crank pulley housing 110 may cause pulley belt 116 to move. The motion of pulley belt 116 may cause air conditioner pulley 114 to rotate. As a result, air conditioner pulley 114 may transmit rotation to drive shaft 112 causing drive shaft 112 to rotate and drive air conditioner compressor 106.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle, comprising:
   an engine having an engine block and a crankshaft;
   a crank pulley housing disposed adjacent the engine block, the crank pulley housing including a crank pulley configured to receive a pulley belt;
   a planetary gear mechanism disposed within the crank pulley housing and configured to be connected to the crankshaft;
   a motor disposed within the crank pulley housing;
   an electrical power source connected to the motor; and
   an auxiliary machine configured to be driven by one of the motor and the engine.

2. The system according to claim 1, wherein the crank pulley housing comprises a crank pulley sidewall associated with a gear of the planetary gear mechanism.

3. The system according to claim 2, wherein the planetary gear mechanism comprises a sun gear extending from the crank pulley sidewall.

4. The system according to claim 1, wherein the planetary gear mechanism is configured to be connected to a crankshaft.

5. The system according to claim 1, further comprising a clutch configured to be selectively engaged with the planetary gear mechanism to allow rotation to be transmitted between the crank pulley housing and a crankshaft.

6. The system according to claim 5, wherein the clutch is configured to be selectively disengaged from the planetary gear mechanism to prevent rotation from being transmitted between the crank pulley housing and the crankshaft.

7. The system according to claim 1, wherein the motor comprises a brushless motor.

8. The system according to claim 7, wherein the motor comprises a first component disposed on an inner surface of the crank pulley housing and a second component disposed on an engine block.

9. A motor vehicle, comprising:
   an engine having an engine block and a crankshaft;
   a crank pulley housing disposed adjacent the engine block and having a crank pulley and a crank pulley sidewall;
   a planetary gear mechanism disposed within the crank pulley housing;
   a motor disposed between the planetary gear mechanism and an inner surface of the crank pulley;
   an electrical power source connected to the motor; and
   an auxiliary machine configured to be driven by one of the motor and the engine.

10. The system according to claim 9, further comprising a clutch configured to be selectively engaged with the planetary gear mechanism.

11. The system according to claim 10, wherein the planetary gear mechanism comprises an outer gear configured to be selectively engaged by the clutch.

12. The system according to claim 10, wherein the clutch is configured to be selectively engaged with the planetary gear mechanism to allow rotation to be transmitted between the crank pulley housing and a crankshaft.

13. The system according to claim 9, wherein the planetary gear mechanism is configured to amplify torque transmitted from the motor to a crankshaft.

14. The system according to claim 9, wherein the motor comprises a brushless motor.

15. A system, comprising:
   a planetary gear mechanism configured to be connected to a crankshaft of an engine;
   a motor circumferentially surrounding the planetary gear mechanism; and
   a crank pulley housing circumferentially surrounding the motor.

16. The system according to claim 15, wherein the planetary gear mechanism comprises a sun gear associated with the crank pulley housing, the sun gear having sun gear teeth.

17. The system according to claim 16, wherein the planetary gear mechanism comprises at least one planet gear having planet gear teeth configured to mesh with the sun gear teeth and a planet carrier configured to be connected to a crankshaft and to receive the at least one planet gear.

18. The system according to claim 17, wherein the planetary gear mechanism further comprises an outer gear circumferentially surrounding the at least one planet gear and having outer gear teeth configured to mesh with the planet gear teeth.

19. The system according to claim 18, further comprising a clutch configured to selectively engage the outer gear preventing the outer gear from rotating.

20. The system according to claim 15, wherein the motor is configured to rotate the crank pulley housing.

* * * * *